United States Patent
Li

(10) Patent No.: US 12,277,754 B2
(45) Date of Patent: Apr. 15, 2025

(54) GENERATING SYNTHETIC TRAINING DATA AND TRAINING A REMOTE SENSING MACHINE LEARNING MODEL

(71) Applicant: Deere & Company, Moline, IL (US)

(72) Inventor: Yueqi Li, San Jose, CA (US)

(73) Assignee: Deere & Company, Moline, IL (US)

( * ) Notice: Subject to any disclaimer, the term of this patent is extended or adjusted under 35 U.S.C. 154(b) by 407 days.

(21) Appl. No.: 17/825,615

(22) Filed: May 26, 2022

(65) Prior Publication Data

US 2023/0386183 A1 Nov. 30, 2023

(51) Int. Cl.
*G06V 10/774* (2022.01)
*G06V 20/10* (2022.01)
*G06V 20/13* (2022.01)

(52) U.S. Cl.
CPC .......... *G06V 10/7747* (2022.01); *G06V 20/13* (2022.01); *G06V 20/188* (2022.01)

(58) Field of Classification Search
CPC .. G06V 10/7747; G06V 20/13; G06V 20/188; G06V 10/764; G06V 10/774; G06V 20/17
See application file for complete search history.

(56) References Cited

U.S. PATENT DOCUMENTS

| | | | |
|---|---|---|---|
| 2020/0126232 A1* | 4/2020 | Guo | A01D 41/127 |
| 2020/0364843 A1* | 11/2020 | Stueve | G06V 10/764 |
| 2022/0067451 A1* | 3/2022 | Wang et al. | G06V 30/194 |
| 2022/0198221 A1* | 6/2022 | Avegliano | G06N 3/045 |

OTHER PUBLICATIONS

Ferencz, et al., "Crop Yield Estimation By Satellite Remote Sensing", International Journal of Remote Sensing. vol. 25, No. 20, 4113-4149, dated Oct. 20, 2004.

* cited by examiner

*Primary Examiner* — Molly Wilburn
(74) *Attorney, Agent, or Firm* — Fenwick & West LLP

(57) ABSTRACT

Implementations are described herein for training a remote sensing machine learning model. In various implementations, ground-truth low elevation images that depict particular crop(s) in particular agricultural area(s) and terrain conditions observed in the agricultural area(s) are identified. A plurality of low elevation training images is generated based on the ground truth low elevation training images to include the plurality of ground truth low elevation images and synthetic low elevation images generated based on synthetic terrain conditions. The plurality of low-elevation training images are processed using a synthetic satellite image machine learning model to generate the plurality of synthetic satellite training images, which are then processed by the remote sensing machine learning model to generate inferred terrain conditions. The remote sensing machine learning model is then trained based on a comparison of the inferred terrain conditions and the corresponding observed or synthetic terrain conditions.

20 Claims, 5 Drawing Sheets

GENERATING SYNTHETIC TRAINING DATA AND TRAINING A REMOTE SENSING MACHINE LEARNING MODEL

BACKGROUND

Vision data captured from various elevations, such as vision data captured by a vision sensor mounted to a farm tractor or captured by a satellite, are useful for a variety of agricultural monitoring purposes. Vision data of crop fields can be used to make various agricultural predictions and inferences, particularly when operational and/or other observational data describing terrain conditions and/or agricultural practices in the field is available. For example, it is beneficial to frequently observe crop fields for crop health, pests, weeds, disease, and/or irrigation monitoring purposes. As another example, it is beneficial to observe the response of crops to application of a new fertilizer or pesticide.

Vision data captured from high elevations, such as satellite imagery, images captured by high-elevation unmanned aerial vehicles (e.g., UAV "drones" or balloons), manned aircraft (e.g., airplanes), or images captured by high elevation manned aircraft (e.g., space shuttles), are useful for a variety of agricultural monitoring processes. For one thing, acquiring digital imagery from high elevations allows large expanses of land to be captured in the imagery with relatively little effort or cost. On the other hand, a challenge of satellite imagery is that its resolution is relatively coarse—individual plants may not even be distinguishable.

SUMMARY

Vision data captured from ground-level is particularly useful for a variety of agricultural monitoring processes because unlike high-elevation imagery, ground-level imagery is relatively granular, allowing observations to be made at the individual plant level, or even at the level of a particular plant part (e.g., leaves, stems, roots, etc.). Ground-level vision data can be gathered in a variety of ways, such as by vision sensors mounted to farm machinery (e.g., tractors) and images taken by farm personnel or agricultural robots/rovers via fixed or mobile cameras available on the farm. However, capturing ground-level imagery through an entire field or farm can be cumbersome and expensive, particularly if it is done often and/or if the field in question is large, which is often the case. Moreover, ground-level vision sensors only capture a limited field of view and perspective. Consequently, it is difficult to make widespread inferences about crops across large agricultural fields using ground-level imagery.

It is therefore desirable to leverage high-elevation imagery that captures a large geographical area, particularly satellite imagery, to perform what is referred to herein as "remote sensing"—that is, inferring terrain conditions from high-elevation imagery based on subtle variations in pixel values. However, there are a variety of challenges associated with training a remote sensing machine learning model to infer terrain characteristics. Satellite images may be taken days, weeks, months, or years apart. Detecting and/or inferring ground truth terrain conditions from satellite imagery is difficult because of the lower resolution, as opposed to the higher resolution of lower-elevation imagery, which can often be labeled by human actors. However, low-elevation imagery for a given geographic area may be sparse, and therefore may fail to capture enough combinations of terrain conditions in these higher resolutions to adequately train a machine learning model to robustly detect terrain conditions. In short, pairs of satellite imagery and corresponding lower-elevation (e.g., ground level, drone level) observations about terrain conditions, may be scarce.

For instance, satellite imagery may depict a particular crop field where approximately 50% of the crops are known (from ground truth observations or images) to be suffering from a particular disease. There may also exist satellite imagery capturing a crop field (the same or different crop field) with the same crop type where approximately 10% of the crops in the field are known to be suffering from the particular disease. However, there may be no satellite imagery available that shows a crop field with the same crop type where approximately 30% of the crops are known to suffer from the particular disease. A remote sensing machine learning model trained on this sparse satellite imagery may be able to determine when crop fields containing crops of that type are suffering from the particular disease at approximate 10% and 50% rates, but may not be able to accurately calculate other approximate rates of disease proliferation.

This becomes an even bigger issue when all of the potential terrain conditions of an agricultural area are considered in combination. For example, an image captured by a satellite may include pixels that each represent a 10 meter by 10 meter area at ground-level. Various combinations of terrain conditions existing in the area captured by the satellite image may cause only slight changes in the appearance of a given pixel or group of pixels. Thus, the remote sensing machine learning model will be best trained when the available satellite training imagery captures the largest amount of variations possible for the different possible terrain conditions of the agricultural environment, and corresponding ground-level data about regions captured is known.

Accordingly, implementations are described herein for generating realistic synthetic satellite imagery that simulates myriad variations of terrain conditions. Implementations are also described herein for using this realistic synthetic satellite imagery to train a remote sensing machine learning model training so that it can be used to process satellite imagery to infer terrain conditions in satellite imagery for which underlying terrain conditions are not readily known (e.g., from ground-level observations).

In some implementations, this training may be accomplished using low-elevation training images for which terrain conditions are established, e.g., by having been observed/labeled/annotated. These low-elevation training images include both (1) ground truth low-elevation images capturing various terrain conditions in agricultural areas, and (2) synthetic low-elevation images generated based on variations and/or permutations of the terrain conditions captured in the ground truth low-elevation images. These ground truth and synthetic low-elevation training images may then be processed using a "synthetic satellite image" machine learning model to generate synthetic satellite training images. The remote sensing machine learning model may then be trained using these synthetic satellite training images and the corresponding varied/permuted terrain conditions. Once trained, the remote sensing machine learning model may be usable subsequently to process one or more ground truth satellite images capturing a plurality of agricultural areas, in order to infer one or more terrain conditions for those agricultural areas.

In some implementations, rather than or in addition to using annotations, the remote sensing machine learning model may be trained using the low-elevation training images themselves. In such an implementation, the remote sensing machine learning model can thus be trained to provide synthetic low-level imagery as the output that infers the one or more terrain conditions of that plurality of agricultural areas.

In some implementations, ground truth satellite images that correspond to the ground truth low-elevation images may be used as the corresponding high-elevation training images for those corresponding low-elevation training images. That is, synthetic satellite imagery may only be generated for the synthetic ground-level imagery, and the high-elevation training images may include a mixture of this synthetic satellite imagery alongside ground truth satellite imagery.

In some implementations, a time-stamped sequence of high-elevation images may be applied as input to the remote sensing machine learning model and the remote sensing machine learning model may provide output describing or tracking a change, or a rate of change, in one or more of the terrain conditions identified based on the time-stamped sequence of high-elevation images.

In some implementations, the one or more terrain conditions inferred from processing one or more high-elevation images using the remote sensing machine learning model may be provided to a client application executing on a computing device accessible to agricultural personnel. This may allow the agricultural personnel to view inferred terrain conditions, including imagery in some implementations, for crop fields for which they would otherwise have little ground-level data.

In some implementations, a method for training a remote sensing machine learning model based on a plurality of synthetic satellite training images may be implemented using one or more processors and may include: accessing a plurality of ground truth low-elevation images that depict one or more particular crops growing in one or more agricultural areas, wherein the ground truth low-elevation images are captured within a first elevation range that is below a second elevation range that corresponds to low earth orbit; identifying terrain conditions observed in the one or more agricultural areas; generating a plurality of low-elevation training images data based on the ground truth low-elevation images, wherein the plurality of low-elevation training images include: a first subset comprising the plurality of ground truth low-elevation images, and a second subset comprising synthetic low-elevation images generated based on synthetic terrain conditions, wherein the synthetic terrain conditions comprise variations of the observed terrain conditions; processing the plurality of low-elevation training images using a synthetic satellite image machine learning model to generate the plurality of synthetic satellite training images; processing the plurality of synthetic satellite training images using the remote sensing machine learning model to generate inferred terrain conditions; and training the remote sensing machine learning model based on a comparison of the inferred terrain conditions and the corresponding observed or synthetic terrain conditions.

In various implementations, generating the plurality of low-elevation training images can include artificially altering a given ground-truth low-elevation image of the first subset exhibiting a first terrain condition at a first level of coverage to generate, for the second subset, a particular synthetic low-elevation image exhibiting the first terrain condition at a second level of coverage that is different than the first level of coverage. In some or all of those implementations, the altering can include artificially altering the given ground-truth low-elevation image of the first subset to increase or decrease a level of coverage of a second terrain condition to generate the particular synthetic low-elevation image.

In various implementations, generating the plurality of low-elevation training images can include generating at least one of the plurality of synthetic low-elevation images based on at least two of the plurality of ground truth low-elevation images that exhibit two different levels of coverage of a given terrain condition of the identified terrain conditions, wherein the at least one of the plurality of synthetic low-elevation images is generated to include a third level of coverage of the given terrain condition that is different from the two different levels of coverage.

In various implementations, the plurality of terrain conditions can include one or more of: soil type, soil condition, plant type, plant condition, or plant density.

In various implementations, the plurality of ground truth low-elevation images can be captured by one or more unmanned aerial vehicles (UAVs) and/or by one or more ground-based robots traveling through or above the one or more agricultural areas.

In various implementations, the method can further include accessing a set of ground truth satellite images capturing at least one of the one or more particular crops growing in a different agricultural area than the one or more agricultural areas captured in the ground truth low-elevation images; and processing the set of ground truth satellite images using the remote sensing machine learning model to generate inferred terrain conditions of the different agricultural area. In some or all of those implementations, the set of ground truth satellite images can include time-stamped sequence of ground truth satellite images capturing the different agricultural area, and the inferred terrain conditions of the different agricultural area can include a change or rate of change of one or more of the terrain conditions of the different agricultural area.

In various implementations, the method can further include accessing a set of ground truth satellite images capturing the one or more agricultural areas, and the training of the remote sensing machine learning model can be further based on the set of ground truth satellite images.

In various implementations, inferring the one or more terrain conditions can include generating one or more synthetic low elevation images.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION OF THE DRAWINGS

Figure 1:
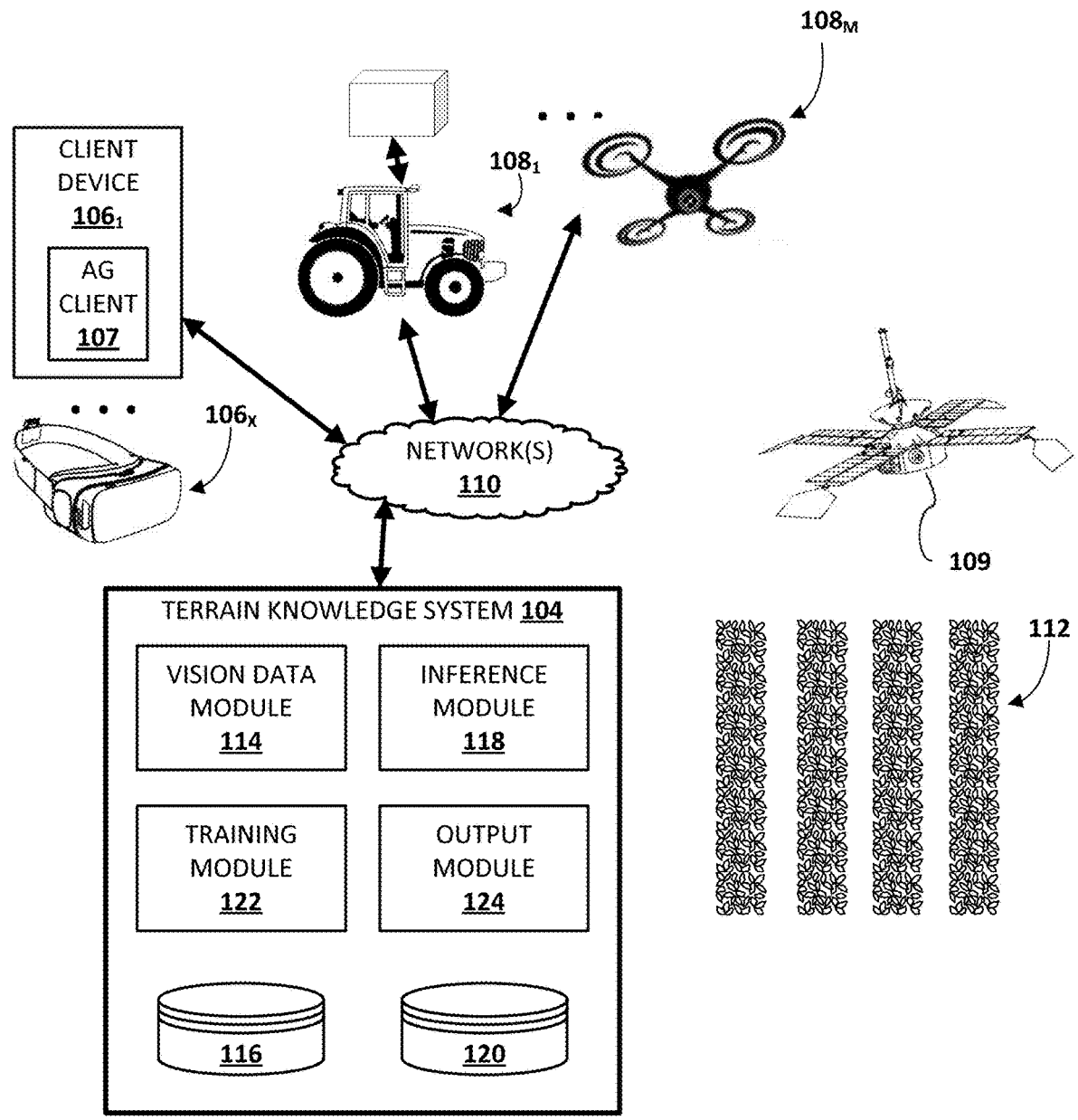
FIG. 1 schematically illustrates an environment in which one or more selected aspects of the present disclosure may be implemented, in accordance with various implementations.

FIG. 1 schematically illustrates an environment in which one or more selected aspects of the present disclosure may be implemented, in accordance with various implementations. The example environment includes agricultural areas 112 and various equipment that may be deployed at or near those areas, as well as other components that may be implemented elsewhere, in order to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

Agricultural areas 112 may include agricultural fields displaying a myriad of terrain conditions and being used to grow various types of crops that may produce plant parts of economic and/or nutritional interest. Agricultural areas 112 may include, for instance, one or more crop fields, one or more plots, one or more gardens, one or more greenhouses, or any other areas in which there may be an interest or desire to automatically detect, classify, and/or segment terrain conditions. "Terrain conditions" may include, for instance, type of terrain-, plant conditions, soil conditions, and particular traits of plants.

Terrain types may include indications of various terrain media (e.g., soil, water, sand, snow, ice, etc.), as well as indications of terrain layout (e.g., degree of slant or slope, overlaps or gradients between terrain features). Plant conditions may include indications of disease suffering, mold or pest infestation, overwatering or underwatering, withering, burning (e.g., from "hot" fertilizer), color changes (e.g., due to lighting), foliage levels, plant density, weed density, presence or absence or plant parts-of-interest, etc. Soil conditions include indications of soil makeup, soil density, over- or underwatering conditions, mold or pest infestations, tillage levels, erosion measures, etc. Plant traits may take various forms, including but not limited to plant types (e.g., genus, species, variety, etc.), plant gender, various observable characteristics of a plant resulting from an interaction of the plant's genotype with its environment ("phenotype"), stage of growth, etc.

As one non-limiting example, there may be considerable interest and/or benefit in automatically detecting plants having a trait of being "infested" (e.g., suffering extensive damage due to pests or disease) in agricultural areas 112 in which other desired plants are being grown. Once detected, various remedial actions may be taken, such as flagging the infested plants' locations for removal or treatment (e.g., pesticide or fungicide application) by agricultural personnel and/or farming equipment.

An individual (which in the current context may also be referred to as a "user") may operate one or more client devices $106_{1-X}$ to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") $106_X$ that provides an AR or VR immersive computing experience, a "smart" watch, and so forth. Additional and/or alternative client devices may be provided.

Terrain knowledge system 104 is an example of an information system in which the techniques described herein may be implemented. Each of client devices 106 and terrain knowledge system 104 may include one or more memories for storage of data and software applications, one or more processors for accessing data and executing applications, and other components that facilitate communication over a network. The operations performed by client device 106 and/or terrain knowledge system 104 may be distributed across multiple computer systems.

Each client device 106 may operate a variety of different applications that may be used to perform various agricultural tasks, such as crop monitoring and diagnosis. For example, a first client device $106_1$ operates agricultural ("AG") client 107 (e.g., which may be standalone or part of another application, such as part of a web browser). Another client device $106_X$ may take the form of a HMD that is configured to render 2D and/or 3D data to a wearer as part of a VR immersive computing experience. For example, the wearer of client device $106_X$ may be presented with 3D point clouds representing various aspects of objects of interest, such as plants or groups of plants having certain characteristics or conditions, disease or pest indications, soil conditions, etc. The wearer may interact with the presented data, e.g., using HMD input techniques such as gaze directions, blinks, etc.

In some implementations, AG client 107 may be used to communicate to agricultural personnel instructions and/or information that can help them perform various agricultural tasks. For example, output module 124 (described in more detail below) may generate a report, a map, an image, instructions, and/or any other data that may be presented to an operator of a client device using a graphical user interface, audibly, etc. These data may inform the agricultural personnel where plants having targeted traits (e.g., weeds, diseased plants, plants have desired characteristics, etc.) or other certain terrain conditions (e.g., flooding, drought, presence of pests or plant diseases, soil conditions, etc.) are located, what action(s) should be taken on those plants or portions of the terrain and a timeframe in which those action(s) should be taken.

In some implementations, farm machinery $108_{1-M}$ may be deployed to perform various agricultural tasks. Performance of some of these tasks—including but not limited to weed remediation, plant harvesting, etc.—may be performed based on inferences generated using remote sensing machine learning model(s) trained to determine ground truth terrain conditions based on satellite imagery, as described herein. Farm machinery $108_{1-M}$ may take various forms, such as a tractor $108_1$, a robot (not depicted) that is propelled along a wire, track, rail or other similar component that passes over and/or between crops, an unmanned aerial vehicle ("UAV") $108_M$, or any other form of farm machinery capable of being propelled or propelling itself past or over agricultural area(s) 112 of interest.

Farm machinery $108_{1-M}$ may include and/or be equipped with various types of sensors, such as vision sensors (e.g., 2D digital cameras, 3D cameras, 2.5D cameras, infrared cameras, etc.), inertial measurement unit ("IMU") sensors, Global Positioning System ("GPS") sensors, X-ray sensors, lasers, photodiodes (e.g., for sunlight), etc. In some implementations, one or more sensor-equipped modular computing devices (alternatively referred to as "sensor packages") can be mounted on agricultural vehicles (e.g., to tractor $108_1$), or parts attached to agricultural vehicles (e.g., a sprayer or boom affixed to tractor $108_1$), to allow data gathering from the various portions of various fields that each type of agricultural vehicle travels through or above. For example, a tractor $108_1$ may be outfitted with one or more vision sensors and deployed on the ground to capture imagery of a field at ground-level. As another example, an unmanned aerial vehicle ("UAV") $108_M$ may be outfitted with vision sensor(s) and deployed in a range of elevations (e.g., between about 100' and about 10,000') to capture imagery of multiple fields, or even multiple farms. As used herein, the term "low elevation", as applied to image or vision data, describes imagery captured from vision sensors deployed in an elevation range below a near-earth orbit elevation range (e.g., tractors, ground-based robots, UAVs, planes, etc.).

Other vision sensors (e.g., 2D digital cameras, 3D cameras, 2.5D cameras, infrared cameras, etc.) can also be deployed at or above near-earth orbit elevation levels via one or more satellites 109. Satellite image vision data gathered in this manner can be used alongside low elevation vision data, and in some implementations alongside other sensor data, gathered at low elevations by farm machinery $108_{1-M}$ to train a remote sensing machine learning model to make various agricultural inferences about ground-level conditions on the farm using satellite imagery, as described herein.

In various implementations, terrain knowledge system 104 may be implemented across one or more computing systems that may be referred to as the "cloud." Terrain knowledge system 104 may receive vision data generated by farm machinery $108_{1-M}$ at various agricultural sites and one or more satellites 109 and process it using various image processing techniques to perform tasks such as detection, classification, and/or segmentation of plants, plant conditions, and other terrain attributes. In various implementations, terrain knowledge system 104 may include a vision data module 114 and an inference module 118. In some implementations one or more of modules 114 and 118 may be omitted, combined, and/or implemented in a component that is separate from terrain knowledge system 104.

Terrain knowledge system 104 may also include one or more databases. For example, terrain knowledge system 104 may include, in communication with vision data module 114, an imagery database 116 for storing image data captured by, for instance, agricultural personnel and/or farm machinery $108_{1-M}$ and/or satellite 109. Terrain knowledge system 104 may also include a machine learning model database 120 that includes the various machine learning models described herein. For example, database 120 can include various machine learning models trained to detect or classify plants, plant attributes, and other terrain conditions in digital imagery and/or to generate synthetic data that is tailored towards certain terrain conditions at various elevation levels. In this specification, the term "database" and "index" will be used broadly to refer to any collection of data. The data of the database and/or the index does not need to be structured in any particular way and it can be stored on storage devices in one or more geographic locations.

Vision data module 114 may be configured to obtain digital images and/or other imagery data from various sources, such as imagery database 116 purposed as an imagery clearinghouse, as well as from sources such as farm machinery $108_{1-M}$ and satellite(s) 109. Vision data module 114 may then provide this imagery data to inference module 118 and/or to training module 122. In other implementations, vision data module 114 may be omitted and the functions described herein as being performed by vision data module 114 may be performed by other components of terrain knowledge system 104, such as inference module 118.

Training module 122 may be configured to train a remote sensing machine learning model to detect various terrain conditions using ground-truth and synthetic, low elevation and satellite captured, vision data. The trained remote sensing machine learning model will then be used by inference module 118 to ensure that agricultural personnel receive indications of various remotely sensed terrain conditions for their particular agricultural area 112. The remote sensing machine learning model trained by training module 122 and the training processes will be discussed in more detail with respect to FIGS. 2-5.

Inference module 118 may be configured to apply imagery data received from vision data module 114 as input across the remote sensing machine learning model stored in machine learning model database 120 to generate output. This output may be indicative of plant traits and various other terrain conditions that are detected and/or classified based on satellite image data received from vision data module 114. To this end, the remote sensing machine learning model stored in database 120 may be trained to infer terrain conditions of agricultural area(s) 112 captured in satellite imagery. Moreover, in some implementations described herein, the remote sensing machine learning model may infer a change or rate of change in one or more of the conditions captured in one or more time-stamped sequences of ground truth satellite images.

Various types of machine learning models may be used to infer, classify, and/or segment terrain conditions based on low elevation and/or satellite image data, such as a feed forward neural network, convolutional neural networks ("CNN"), a recurrent neural network, a long short-term memory ("LSTM") neural network, a gated recurrent unit ("GRU") neural network, various types of transformer networks, etc. For example, in some implementations, one or more convolutional neural networks ("CNNs") may be trained to generate output indicative of the presence and/or absence of certain terrain attributes depicted in low elevation and/or satellite imagery. As another example, in some implementations, a time-series machine learning model such as a recurrent neural network ("RNN") may be trained to process sequences of low elevation and/or satellite images to generate output indicative of certain terrain attributes, and/or indicative of changes or rates of change of certain attributes over time.

For example, the remote sensing machine learning model used by inference module 118 and trained by training module 122 may be a phenotyping agricultural machine learning model. In FIG. 1, for instance, inference module 118 can be configured to generate annotated image(s) that include pixel-wise and/or bounding shape annotations identifying one or more plants and/or other terrain conditions. These annotations may be used, for instance, to segment the digital image into portions having certain attributes, such as weeds, diseased plants, certain leaf configurations, certain soil characteristics, plants having some desired characteristic, etc.

Inference module 118 may pass data indicative of the inferred terrain conditions in a given agricultural area 112, which in some implementations may include real and/or synthetic low elevation image data and/or satellite image data of the agricultural area 112, to output module 124. Output module 124 may be configured to provide the terrain condition inference data to one or more client devices 106 via AG clients 107 over network(s) 110. In some implementations, output module 124 may additionally or alternatively provide the terrain condition inference data to one or more remote servers or databases via network(s) 110, and AG clients 107 on client devices 106 may obtain access to the terrain condition inference data from the one or more remote servers or databases. In some implementations, one or more agricultural robots or autonomous rovers may be deployed based on the inferred terrain conditions. For example, if pest infestation or disease is inferred using the remote sensing machine learning model, rover(s) or aerial drones may be deployed to the affected areas of agricultural field 112 to apply pesticides or herbicides.

In some implementations, AG client 107 installed on one or more client devices 106 can provide real and/or synthetic low elevation image data for display on the user interface of the client device(s) 106. In such implementations, agricultural personnel can provide user input to the user interface selecting at least a portion of one or more instances of low elevation image data (e.g., selecting a portion of a synthetic low elevation image), and AG client 107 can provide user selection data indicating the user selection to inference module 118 (and/or one or more servers in communication with AG client 107 can). In response to receiving this indication of a user selection, inference module 118 or output module 124 can then provide, for display on the user interface of the client device(s) 106 via AG client(s) 107, one or more inferences with respect to terrain conditions relevant to the portion of the agricultural area 112 that corresponds to the user selection. Additionally or alternatively, in some implementations, detected and/or classified terrain attributes may be relayed to agricultural personnel in other manners that communicate terrain conditions and corresponding locations in one or more fields, such as an annotated grid or a textual report.

Figure 2:
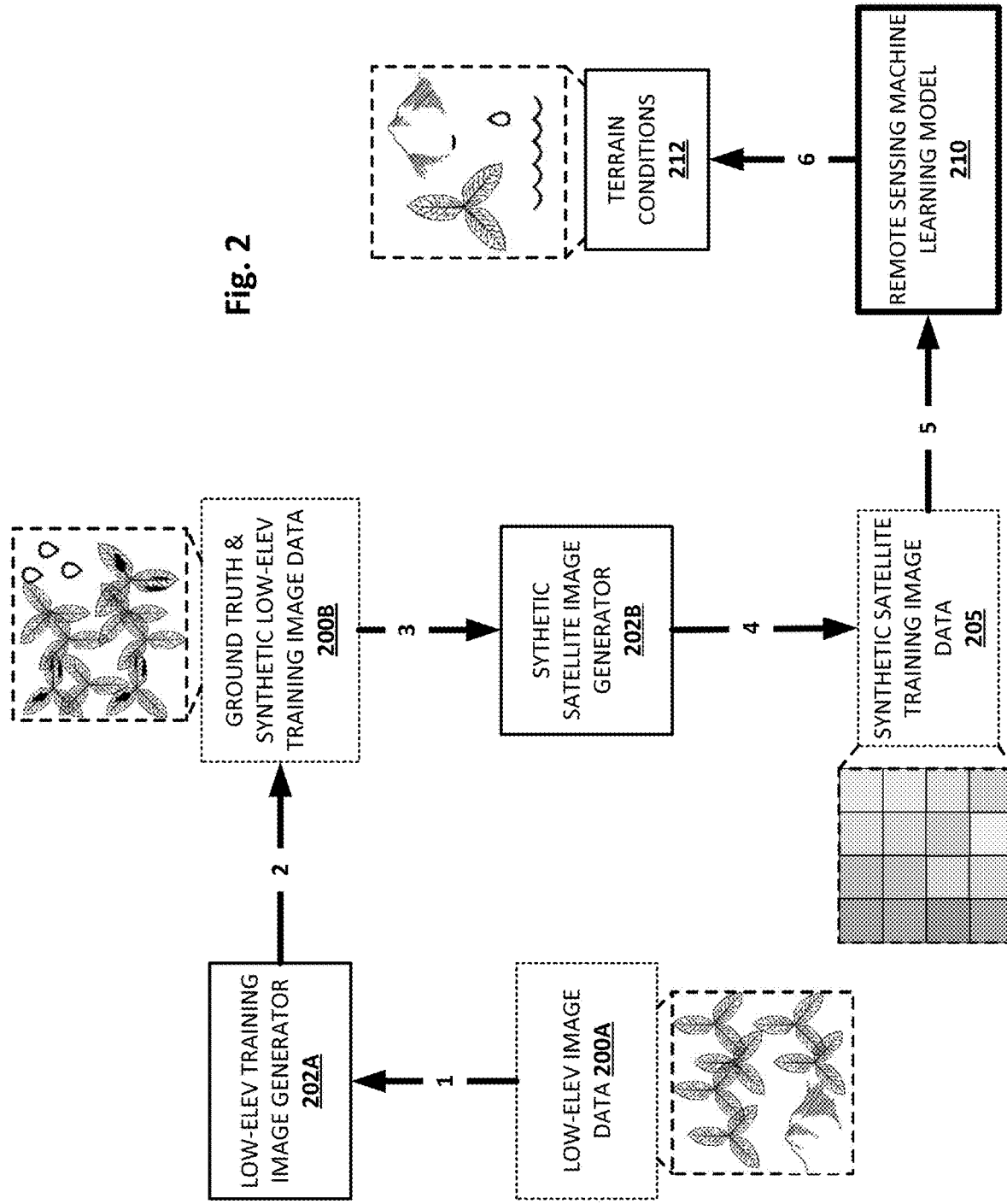
FIG. 2 is an example block diagram that illustrates a training schema for a remote sensing machine learning model.

FIG. 2 is a block diagram that illustrates an example training schema for a remote sensing machine learning model 210. The elements depicted in FIG. 2 may be implemented across one or more computers, or across various components of various computer systems, such as one or more components of computing system(s) that implement terrain knowledge system 104. Moreover, while techniques described with respect to FIG. 2 may be discussed in a particular order, this is not meant to be limiting. One or more techniques discussed herein may be reordered, omitted or added.

The schema of FIG. 2 includes a low-elevation training image generator 202A, a synthetic satellite image generator 202B, and the remote sensing machine learning model 210. A series of arrows 1-6 is depicted in FIG. 2 to demonstrate one example of how data may be processed in order to train the remote sensing machine learning model 210.

At arrow 1, low elevation training image generator 202A processes ground truth low elevation image data 200A input to produce, at arrow 2, a set of ground truth and synthetic low elevation training image data 200B, as will be described in more detail with respect to FIG. 3. For example, at arrow 1, the ground truth low elevation image data 200A can be retrieved from imagery database 116 (e.g., via vision data module 114). The ground truth low elevation image data 200A can depict agricultural area(s) 112 that include a variety of terrain conditions. The ground truth low elevation image data 200A includes a plurality of low elevation images capturing a plurality of fields on several farms in several agricultural regions. These images show various crops having various traits and growing in various conditions.

The set of ground truth and synthetic low elevation training image data 200B generated by the low elevation training image generator 202A can include, for example, synthetic low elevation image data generated to include myriad permutations of terrain conditions detected within the ground-truth low elevation image data 200A. As an example, in some implementations, the synthetic low elevation training image data of the set 200B can depict various degrees or levels of coverage of the terrain conditions detected within the ground-truth low elevation image data 200A. In some implementations, the generation of one or more images included in the synthetic low elevation training image data 200B can include artificially altering one or more of the images include in ground truth low elevation image data 200A to add, omit, and/or modify various terrain conditions, and/or modify (e.g., increase or decrease) the level of coverage of various terrain conditions, present in the ground truth low elevation image data 200A. For example, one or more images included in the synthetic low elevation training image data 200B can be generated to include soybean plants and approximately 40% field coverage of a particular terrain condition based on two or more images included in the ground truth low elevation image data 200A that depict differing levels of coverage, for example 10% and 60% or 20% and 30%. The generation of the synthetic low elevation training image data 200B by the low elevation training image generator 202A is explained in more detail below with respect to FIG. 3.

At arrow 3, synthetic satellite image generator 202B processes the set of ground truth and synthetic low elevation training image data 200B using a synthetic satellite image machine learning model to generate, at arrow 4, output comprising synthetic satellite training image data 205. The synthetic satellite training image data 205 will include synthetic satellite imagery capturing the various terrain conditions depicted in the set of ground truth and synthetic low elevation training image data 200B, but from a satellite-level perspective. Since satellite imagery is capable of capturing vast swaths of land, each pixel and/or each image included in the synthetic satellite training image data 205 may correspond to more than one image included in the set of ground truth and synthetic low elevation training image data 200B. The generation of the satellite training image data 205 by the synthetic satellite image generator 202B is explained in more detail below with respect to FIG. 3.

At arrow 5, the remote sensing machine learning model 210 may be used to process the synthetic satellite training image data 205 as input and produces, at arrow 6, output indicating one or more inferences about terrain conditions 212 in one or more of the agricultural areas depicted in the synthetic satellite training image data 205. Because the set of ground truth and synthetic low elevation training image data 200B is generated based on determining and graphically incorporating various terrain conditions at known pixel locations, these images effectively form annotated or labeled training data that can be compared by training module 122 with the output terrain conditions 112 generated by the remote sensing model 210 at arrow 6. The output terrain conditions 112 of the remote sensing machine learning model 210 and the known terrain conditions of the set of ground truth and synthetic low elevation training image data 200B can be compared, and the difference or the error can be used to train the remote sensing machine learning model 210, e.g., using techniques such as back propagation, gradient descent, etc.

Figure 3:
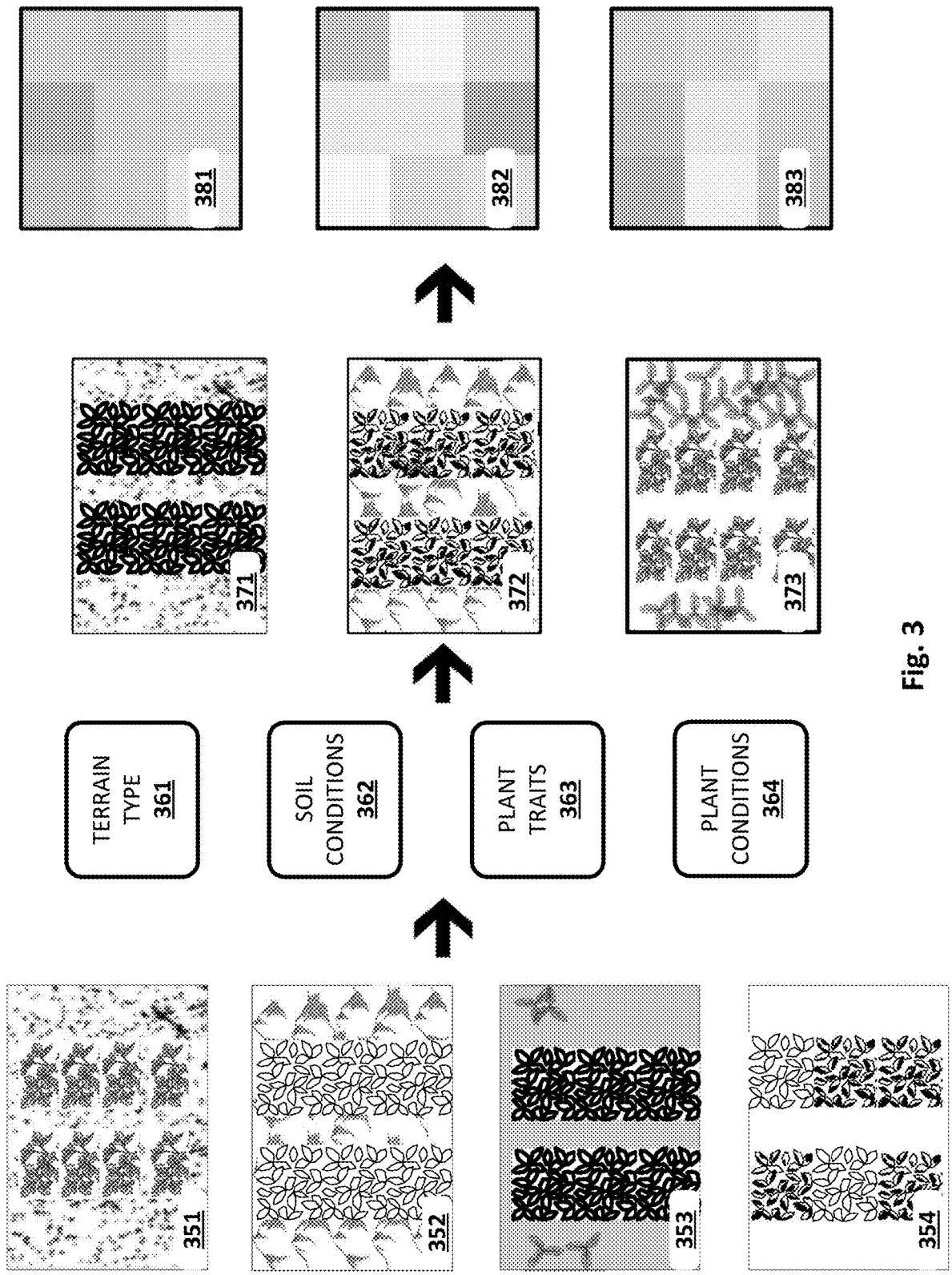
FIG. 3 illustrates an example process flow for generating synthetic image training data in accordance with various implementations described herein.

FIG. 3 illustrates an example process flow for generating synthetic image training data in accordance with various implementations described herein. Starting at the left column of FIG. 3, each of the ground truth low elevation images 351-354 capture one or more fields on one or more farms in a particular agricultural region. While only four images are shown as example ground truth low elevation images 351-354 in FIG. 3, it should be appreciated that the process described with respect to FIG. 3 can be performed with any plurality of ground truth low elevation images for a particular agricultural region. It can be assumed that ground truth elevation images 351-354 have been captured in this example from a UAV (e.g., $108_M$).

Ground truth low elevation image 351 captures carrot plants growing in one or more fields in a first geographical portion of the particular agricultural region. The carrot field(s) captured in ground truth low elevation image 351 do not show signs of weed, mold, or pest infestation. However, ground truth low elevation image 351 does depict light flooding on top of slightly compacted soil, with approximately 30% of the carrot field(s) being covered in pooling water.

Ground truth low elevation image 352 captures soybean plants growing in one or more fields in a second geographical portion of the particular agricultural region. The soybean field(s) captured in ground truth low elevation image 352 do not show signs of weed, mold, or pest infestation. Ground truth low elevation image 352 further depicts fluffy, well-tilled soil in the soybean field(s). There are no signs of flooding (e.g., 0% of relevant area is covered with pooling water).

Ground truth low elevation image 353 captures a different set of soybean plants growing in one or more fields in a third geographical portion of the particular agricultural region. The soybean field(s) captured in ground truth low elevation image 353 show approximately 5% of the depicted plants are weeds, and/or that approximately 5% of the ground area is covered by one or more types of weeds. Ground truth low elevation image 353 further depicts the soybean plants drooping as if overwatered and dark, water-logged soil conditions with approximately 40% of the soybean field(s) being covered with pooling water.

Ground truth low elevation image 354 captures yet another different set of soybean plants growing in one or more fields in a fourth geographical portion of the particular agricultural region. Ground truth low elevation image 354 shows approximately 70% of the soybean plants in the field(s) being affected a particular plant disease, with various soybean plants each showing between 0% and 40% coverage of coloring associated with that particular plant disease (e.g., yellow, brown, grey, etc.). The soybean field(s) of ground truth low elevation image 354 are depicted with highly-compacted and extremely dry soil conditions.

The second from the left column of FIG. 3 illustrates various terrain attributes 361-364 detected from the ground truth low elevation images 351-354 by one or more machine learning models. For example, low elevation training image generator 202A of FIG. 2, or one or more other machine learning models stored in database 116 or otherwise accessible to terrain knowledge system 104, can be configured to process ground truth low elevation images 351-354 as input in order to provide, as output, indications of detected terrain types 361 (e.g., different types of terrain media, measures describing terrain layout, etc.), soil conditions 362 (e.g., soil mixture makeup, density measures, water levels, etc.), plant traits 363 (e.g., genus/species/variety, gender, phenotype, stage of growth, etc.), and plant conditions 364 (e.g., foliage levels, presence or absence or plant parts-of-interest, gradients in plant coloring, degree of coverage or type of disease, mold, or pest infestation, etc.) detected in the ground truth low elevation images 351-354.

For example, in some implementations, the one or more machine learning models used to detect the terrain attributes 361-364 in the ground truth low elevation images 351-354 may be trained to perform object recognition, in which case the output terrain attributes 361-364 may correspond to bounding shapes such as bounding boxes. In some implementations, the one or more machine learning models detecting the terrain attributes 261-264 may be trained to perform image segmentation, and the output terrain attributes 361-364 may correspond to annotations of individual pixels and/or regions of pixels in the ground truth low elevation images 351-354. Other image processing techniques, detection, and recognition using machine learning models are also contemplated. Further, in some implementations, one or more of the machine learning models or one or more layers of the machine learning model(s) may use different image processing, detection, and recognition techniques. For example, in some implementations, one or more of the layers may extract or classify lines, shapes, boxes, or pixels representing certain terrain attributes, while other layers extract, detect, or classify other terrain attributes. These layers may provide embedding or feature vectors as inputs to further machine learning model(s) or layer(s) of machine learning model(s) that output embedding or feature vectors representing further terrain attributes, such as aggregate attributes of geographical regions (e.g., whole fields, farms, etc.) and the layout or interplay between other extracted or classified terrain attributes (e.g., if there is pooling or flooding water captured in an image, it is more likely that certain plant traits are indicative of overwatering than underwatering).

The second from the right column of FIG. 3 illustrates example synthetic low elevation images 371-373 generated based on varying and/or permuting the terrain attributes 361-364 and/or the ground truth low elevation images 351-354 themselves. These synthetic low elevation images 371-373 may provide training examples for terrain conditions that were not actually observed in sparse ground truth low elevation images 351-354. This allows for the creation of large amounts of training data without needing comprehensive ground truth observational training data, which as noted previously tends to be sparse because it is cumbersome and/or costly to obtain and/or annotate.

While only three images are shown as example synthetic low elevation images 371-373 in FIG. 3, it should be appreciated that the synthetic low elevation vision data can be generated to include myriad permutations and combinations of terrain attributes extracted from the plurality of input ground truth low elevation images 351-354, including myriad permutations and combinations of degree or level of coverage of a given terrain condition. For example, synthetic low elevation image 371 depicts soybean plants growing in one or more fields in the particular agricultural region. The soybean plants depicted are dropping as if overwatered, there is light flooding on top of slightly compacted soil, and approximately 15% of the soybean field(s) are covered in pooling water. Synthetic low elevation image 372 depicts one or more soybean fields in the particular agricultural region, with the soybean plants in the field(s) being affected a particular plant disease and each showing between 20% and 80% coverage of coloring associated with the disease (e.g., yellowing of leaves). Synthetic low elevation image 372 further depicts fluffy, well-tilled soil in the soybean field(s). Synthetic low elevation image 373 depicts carrot plants growing in one or more fields in the particular agricultural region, wherein approximately 30% of the ground area is covered by weeds. Synthetic low elevation image 373 further depicts highly-compacted and extremely dry soil conditions.

In sum, the synthetic low elevation images 371-373 can be generated to include numerous permutations and/or combination of terrain attributes extracted from the ground truth low elevation images 351-354 (e.g., carrot plants/weeds/dry soil combo). Moreover, the synthetic low elevation images 371-373 can correspond to particular portions of the particular agricultural region, including additional portions of the agricultural region not captured or only partially captured in the plurality of input ground truth low elevation images. It should further be appreciated that the process of FIG. 3 can be performed for more than one particular region, sub-region, or overlapping series of regions. Thus, generating the synthetic low elevation images 371-373 can provide more image data for geographical areas in which data is too sparse to be reliably used to generate synthetic satellite image data.

The rightmost column of FIG. 3 illustrates example synthetic satellite training images 381-383 generated by one or more machine learning models based on the synthetic low elevation training images 371-373, and in some implementations further based on the ground truth low elevation images 351-354. For example, the synthetic satellite image generator 202B of FIG. 2 may be trained to accept the synthetic low elevation images 371-373 (and in some implementations, the ground truth low elevation training images 351-354) as input(s) and provide, as output(s), the synthetic satellite training images 381-383. In some cases, many low elevation images (synthetic and/or ground truth), or transformations of such into the satellite image domain, may be stitched together to create one synthetic satellite training image. For example, each synthetic low elevation image 371-373 and/or ground truth low elevation image 351-354 may correspond to a 10 m×10 m area on the ground, and may be transformed into a single pixel in the synthetic satellite training images 381-383. Additionally or alternatively, a group of synthetic low elevation images 371-373 and/or ground truth low elevation images 351-354 may correspond to a single pixel in the synthetic satellite training images 381-383, and/or a single synthetic low elevation image 371-373 and/or ground truth low elevation image 351-354 may correspond to multiple pixels in the synthetic satellite training images 381-383. Thus, the one or more machine learning models that generate the synthetic satellite training images 381-383 may process a plurality of synthetic low elevation images 371-373 and/or ground truth low elevation images 351-354 covering most or all of the region to be captured in the synthetic satellite training images 381-383 in order to accurately generate the synthetic satellite training images 381-383.

Since the terrain attributes 361-364 (both ground truth and permuted) used to generate the synthetic low elevation images 371-373, which are then used to generate the synthetic satellite training images 381-383, are known, the synthetic satellite training images 381-383 can be used to train the remote sensing machine learning model to detect terrain attributes from satellite imagery, as discussed herein.

Figure 4:
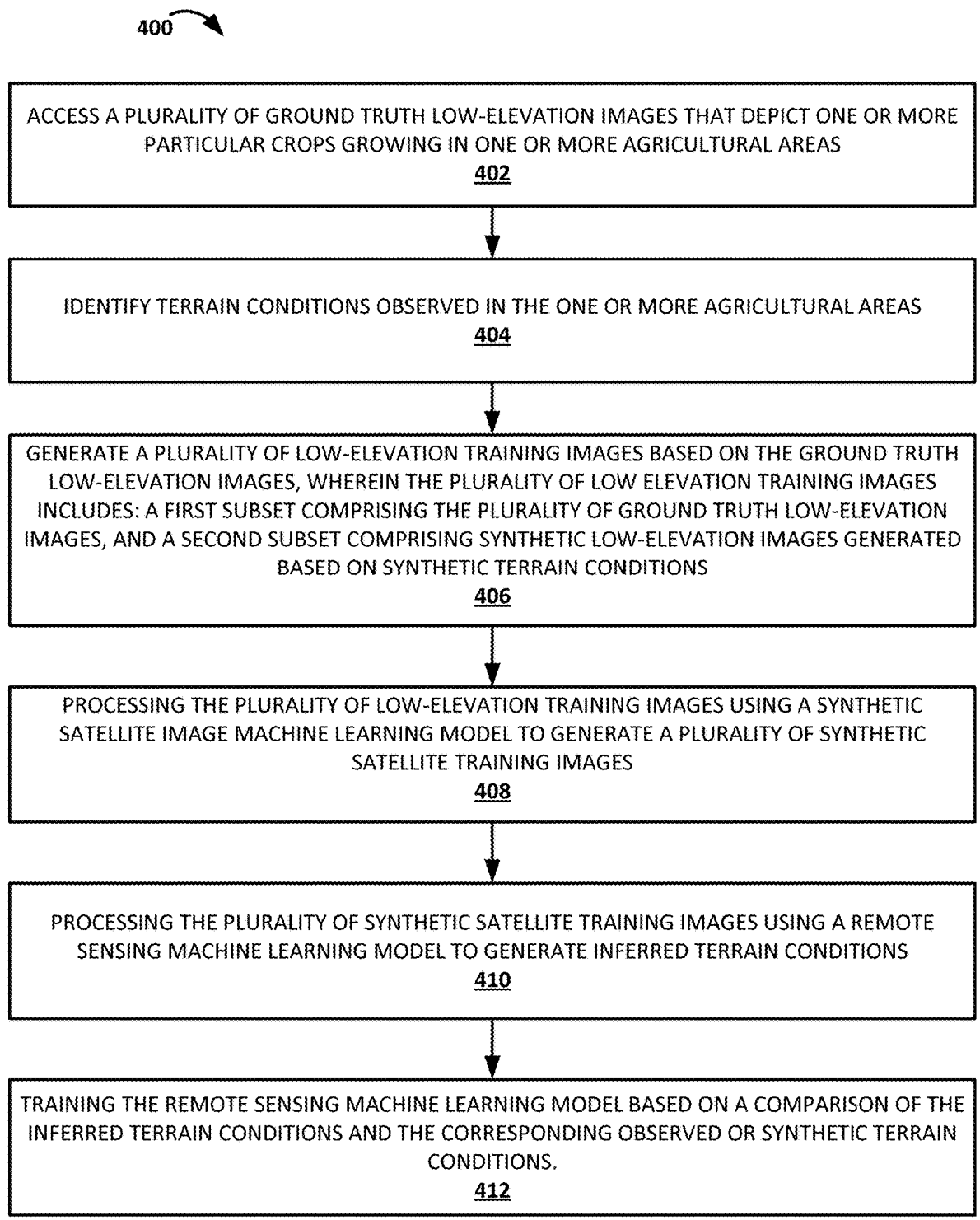
FIG. 4 illustrates a flowchart of an example method for practicing selected aspects of the present disclosure.

FIG. 4 illustrates a flowchart of an example method 400 for practicing selected aspects of the present disclosure. For convenience, operations of method 400 will be described as being performed by a system configured with selected aspects of the present disclosure. Other implementations may include additional operations than those illustrated in FIG. 4, may perform operation(s) of FIG. 4 in a different order and/or in parallel, and/or may omit one or more of the operations of FIG. 4. Example method 400 may be performed by one or more systems, or one or more components of such systems, described herein.

At block 402, the system, e.g., by way of vision data module 114, inference module 118, or training module 122, can access a plurality of ground truth low elevation images that depict one or more particular crops growing in one or more agricultural areas. The ground truth low elevation images may include, for example, images captured by vision sensors mounted to tractors $108_1$ or unmanned aerial vehicles ("UAVs") $108_M$.

At block 404, the system, e.g., by way of training module 122, can process the accessed ground truth low elevation images to identify terrain conditions observed in the one or more agricultural areas. Observed terrain conditions that may be identified include type of terrain, plant conditions, soil conditions, and particular traits of plants (including plant type). Terrain types may include indications of various terrain media (e.g., soil, water, sand, snow, ice, etc.), as well as indications of terrain layout (e.g., degree of slant or slope, overlaps or gradients between terrain features). Plant conditions may include indications of disease suffering, mold or pest infestation, overwatering or underwatering, withering, burning (e.g., from "hot" fertilizer), color changes (e.g., due to lighting), foliage levels, plant density, weed density, presence or absence or plant parts-of-interest, etc. Soil conditions include indications of soil makeup, soil density, over- or underwatering conditions, mold or pest infestations, tillage levels, erosion measures, etc. Plant traits may take various forms, including but not limited to plant types (e.g., genus, species, variety, etc.), plant gender, various observable characteristics of a plant resulting from an interaction of the plant's genotype with its environment ("phenotype"), stage of growth, etc.

At block 406, the system, e.g., by way of low elevation training image generator 202A, generates a plurality of low-elevation training images based on the ground truth low elevation images, wherein the plurality of low elevation training images includes: a first subset comprising the plurality of ground truth low elevation images, and a second subset comprising synthetic low-elevation training images generated based on synthetic terrain conditions. Thus, as explained in more detail above with respect to FIGS. 2 and 3, a set of low elevation training images, including both ground truth images and synthetic images, can be generated to include numerous combinations and/or permutations of the terrain conditions identified in the ground truth low elevation images. For example, the ground truth low elevation images may capture young soybean plants growing in arid soil and mature soybean plants growing in moist soil, but may not capture young soybean plants growing in moist soil. However, synthetic low elevation training images can be generated, as described herein, to include this combination of terrain conditions not observed in the ground truth image data. Moreover, it should be appreciated that since the ground truth terrain conditions of the ground truth low elevation images are known, and then are used to generate the synthetic low elevation training images, the synthetic terrain conditions that correspond to the synthetic low elevation training images will also be known.

At block 408, the system, e.g., by way of inference module 118, will process the plurality of low elevation training images using a synthetic satellite image machine learning model, e.g., synthetic satellite image generator 202B, to generate a plurality of synthetic satellite training images. For example, in some implementations, each low elevation training image of the plurality of low elevation training images may be transformed into a single pixel or group of pixels at a satellite imagery perspective. In some implementations, multiple low elevation training images of the plurality may be transformed into a single pixel or group of pixels at a satellite imagery perspective. In some implementations, the low elevation training images may be stitched together to create an aggregate representation of the total area to be captured by the synthetic satellite training image, and the stitched aggregate representation may be transformed piece by piece or as a whole. Since the ground truth terrain and synthetic terrain conditions that correspond to the plurality of low elevation training images are known, the terrain conditions that correspond to each synthetic satellite training image generated will also be known to the system.

At block 410, the system, e.g., by way of inference module 118, processes the plurality of synthetic satellite training images using a remote sensing machine learning model, e.g., remote sensing machine learning model 210, to generate inferred terrain conditions that correspond to the plurality of synthetic satellite training images. The remote sensing machine learning model can be trained to determine and classify terrain conditions based on colors, textures, and gradients present in the satellite images. The remote sensing machine learning model can be configured to classify individual pixels, groups of pixels, or geographic units that correspond spatially with pixels or groups of pixels into terrain condition classifications, including type of terrain, plant conditions, soil conditions, and particular traits of plants, as described herein.

At 412, the system, e.g., by way of training module 122, can train the remote sensing machine learning model based on a comparison of the inferred terrain conditions for the synthetic satellite training images and the corresponding observed/ground truth or synthetic terrain conditions, e.g., using techniques such as back propagation, gradient descent, etc. Since the observed/ground truth or synthetic terrain conditions are determined based on the low elevation training image data, they may be more accurate or detailed than terrain condition inferences typically made based on satellite imagery. Thus, the remote sensing machine learning model can be trained to be more accurate and detailed than before the training. In some implementations, inferring terrain conditions by the remote sensing machine learning model may include generating one or more corresponding synthetic low elevation images, and the remote sensing machine learning model (and/or another machine learning model described herein) can then be further trained based on the error or difference between the pixels of or terrain conditions in the synthetic low elevation images and the plurality of ground truth low elevation images. Once the remote sensing machine learning model is trained using the plurality of ground truth low elevation photos from a particular agricultural area, it can be used to infer ground truth terrain conditions in that particular agricultural area and/or in different agricultural areas from ground truth satellite images.

Figure 5:
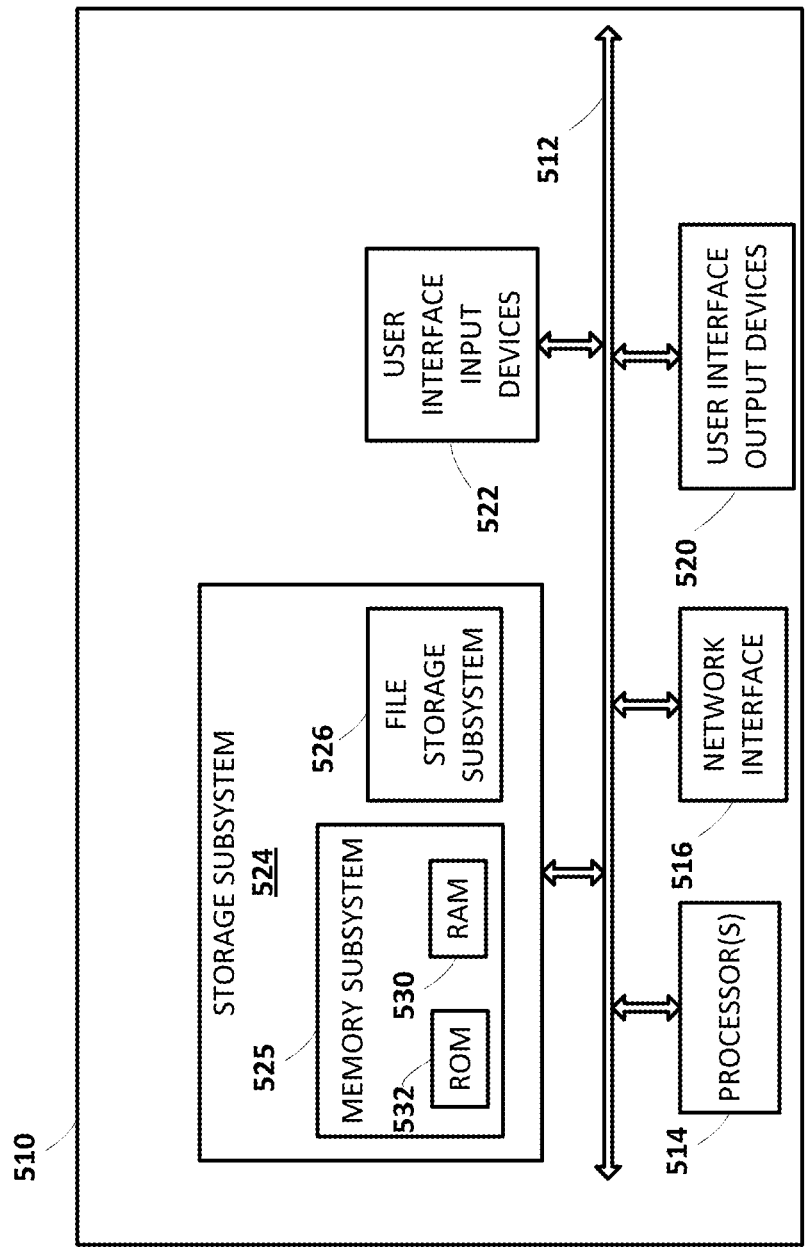
FIG. 5 is a block diagram of an example computing device that may optionally be utilized to perform one or more aspects of techniques described herein.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 510 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include one or more storage devices that include the logic to perform selected aspects of the method 400 described herein, as well as to implement various components depicted in FIGS. 1-3.

These software modules are generally executed by processor 514 alone or in combination with other processors. Memory subsystem 525 used in the storage subsystem 524 can include a number of computer-readable memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 515.

Bus subsystem 512 provides a mechanism for letting the various components and subsystems of computing device 510 communicate with each other as intended. Although bus subsystem 512 is shown schematically as a single bus, alternative implementations of the bus subsystem may use multiple buses.

Computing device 510 can be of varying types including a personal computer, mobile device, workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for training a remote sensing machine learning model based on at least one synthetic satellite training image, the method implemented using one or more processors and comprising:
    accessing a plurality of ground truth low-elevation images that depict one or more particular crops growing in one or more agricultural areas, wherein the ground truth low-elevation images are captured within a first elevation range that is below a second elevation range that corresponds to low earth orbit;
    identifying, for the plurality of ground truth low-elevation images, terrain conditions observed in the one or more agricultural areas;
    generating data of a plurality of low-elevation training images based on the ground truth low-elevation images, wherein the data of the plurality of low-elevation training images includes:
        a first subset comprising the plurality of ground truth low-elevation images and the corresponding observed terrain conditions, and
        a second subset comprising synthetic terrain conditions and synthetic low-elevation images generated based on the synthetic terrain conditions, wherein the synthetic terrain conditions comprise variations of the observed terrain conditions;
    processing the plurality of low-elevation training images using a synthetic satellite image machine learning model to generate the at least one synthetic satellite training image, wherein the plurality of low-elevation training images respectively correspond to different geographic portions of a particular agricultural region and the at least one synthetic satellite training image corresponds to the particular agricultural region;
    processing the at least one synthetic satellite training image using the remote sensing machine learning model to generate inferred terrain conditions for the particular agricultural region; and
    training the remote sensing machine learning model based on a comparison of the inferred terrain conditions and the corresponding observed terrain conditions and the synthetic terrain conditions.

2. The method of claim 1, wherein generating the data of the plurality of low-elevation training images includes artificially altering a given ground-truth low-elevation image of the first subset exhibiting a first terrain condition at a first level of coverage to generate, for the second subset, a particular synthetic low-elevation image exhibiting the first terrain condition at a second level of coverage that is different than the first level of coverage.

3. The method of claim 2, wherein the altering further includes artificially altering the given ground-truth low-elevation image of the first subset to increase or decrease a level of coverage of a second terrain condition to generate the particular synthetic low-elevation image.

4. The method of claim 1, wherein generating the data of the plurality of low-elevation training images further includes generating at least one of the synthetic low-elevation images based on at least two of the plurality of ground truth low-elevation images that exhibit two different levels of coverage of a given terrain condition of the observed terrain conditions, wherein the at least one of the synthetic low-elevation images is generated to include a third level of coverage of the given terrain condition that is different from the two different levels of coverage.

5. The method of claim 1, wherein the inferred terrain conditions include one or more of:
    soil type,
    soil condition,
    plant type,
    plant condition, or
    plant density.

6. The method of claim 1, wherein the plurality of ground truth low-elevation images are captured by one or more unmanned aerial vehicles (UAVs).

7. The method of claim 1, wherein the plurality of ground truth low-elevation images are captured by one or more ground-based robots traveling through the one or more agricultural areas.

8. The method of claim 1, further comprising:
    accessing a set of ground truth satellite images capturing at least one of the one or more particular crops growing in a different agricultural area than the one or more agricultural areas captured in the ground truth low-elevation images; and
    processing the set of ground truth satellite images using the remote sensing machine learning model to generate additional inferred terrain conditions for the different agricultural area.

9. The method of claim 8, wherein the set of ground truth satellite images include a time-stamped sequence of ground truth satellite images capturing the different agricultural area, and wherein the additional inferred terrain conditions for the different agricultural area include a change or rate of change of one or more of the additional inferred terrain conditions of the different agricultural area.

10. The method of claim 1, further comprising:
accessing a set of ground truth satellite images capturing the one or more agricultural areas, wherein the training of the remote sensing machine learning model is further based on the set of ground truth satellite images.

11. The method of claim 1, wherein generating the inferred terrain conditions includes generating one or more synthetic low-elevation images.

12. A system, comprising:
one or more processors; and
one or more storage devices storing instructions that are operable, when executed by the one or more processors, to cause the one or more processors to perform operations comprising:
accessing a plurality of ground truth low-elevation images that depict one or more particular crops growing in one or more agricultural areas, wherein the ground truth low-elevation images are captured within a first elevation range that is below a second elevation range that corresponds to low earth orbit;
identifying, for the plurality of ground truth low-elevation images, terrain conditions observed in the one or more agricultural areas;
generating data of a plurality of low-elevation training images based on the ground truth low-elevation images, wherein the data of the plurality of low-elevation training images includes:
a first subset comprising the plurality of ground truth low-elevation images and the corresponding observed terrain conditions, and
a second subset comprising synthetic terrain conditions and synthetic low-elevation images generated based on the synthetic terrain conditions, wherein the synthetic terrain conditions comprise variations of the observed terrain conditions;
processing the plurality of low-elevation training images using a synthetic satellite image machine learning model to generate at least one synthetic satellite training image, wherein the plurality of low-elevation training images respectively correspond to different geographic portions of a particular agricultural region and the at least one synthetic satellite training image corresponds to the particular agricultural region;
processing the at least one synthetic satellite training image using a remote sensing machine learning model to generate inferred terrain conditions for the particular agricultural region; and
training the remote sensing machine learning model based on a comparison of the inferred terrain conditions and the corresponding observed terrain conditions and the synthetic terrain conditions.

13. The system of claim 12, wherein generating the data of the plurality of low-elevation training images includes artificially altering a given ground-truth low-elevation image of the first subset exhibiting a first terrain condition at a first level of coverage to generate, for the second subset, a particular synthetic low-elevation image exhibiting the first terrain condition at a second level of coverage that is different than the first level of coverage.

14. The system of claim 13, wherein the altering further includes artificially altering the given ground-truth low-elevation image of the first subset to increase or decrease a level of coverage of a second terrain condition to generate the particular synthetic low-elevation image.

15. The system of claim 12, wherein generating the data of the plurality of low-elevation training images further includes generating at least one of the synthetic low-elevation images based on at least two of the plurality of ground truth low-elevation images that exhibit two different levels of coverage of a given terrain condition of the identified observed terrain conditions, wherein the at least one of the synthetic low-elevation images is generated to include a third level of coverage of the given terrain condition that is different from the two different levels of coverage.

16. The system of claim 12, wherein the inferred terrain conditions include one or more of:
soil type,
soil condition,
plant type,
plant condition, or
plant density.

17. The system of claim 12, wherein the instructions further cause the one or more processors to perform operations comprising:
accessing a set of ground truth satellite images capturing at least one of the one or more particular crops growing in a different agricultural area than the one or more agricultural areas captured in the ground truth low-elevation images; and
processing the set of ground truth satellite images using the remote sensing machine learning model to generate additional inferred terrain conditions for the different agricultural area.

18. The system of claim 17, wherein the set of ground truth satellite images include a time-stamped sequence of ground truth satellite images capturing the different agricultural area, and wherein the additional inferred terrain conditions for the different agricultural area include a change or rate of change of one or more of the terrain conditions of the different agricultural area.

19. The system of claim 12, wherein the instructions further cause the one or more processors to perform operations comprising:
accessing a set of ground truth satellite images capturing the one or more agricultural areas, wherein the training of the remote sensing machine learning model is further based on the set of ground truth satellite images.

20. A non-transitory computer-readable medium storing software comprising instructions executable by one or more computers which, upon such execution, cause the one or more computers to perform operations comprising:
accessing a plurality of ground truth low-elevation images that depict one or more particular crops growing in one or more agricultural areas, wherein the ground truth low-elevation images are captured within a first elevation range that is below a second elevation range that corresponds to low earth orbit;
identifying, for the plurality of ground truth low-elevation images, terrain conditions observed in the one or more agricultural areas;
generating data of a plurality of low-elevation training images based on the ground truth low-elevation images, wherein the data of the plurality of low-elevation training images includes:
a first subset comprising the plurality of ground truth low-elevation images and the corresponding observed terrain conditions, and
a second subset comprising synthetic terrain conditions and synthetic low-elevation images generated based on the synthetic terrain conditions, wherein the synthetic terrain conditions comprise variations of the observed terrain conditions;

processing the plurality of low-elevation training images using a synthetic satellite image machine learning model to generate at least one synthetic satellite training image, wherein the plurality of low-elevation training images respectively correspond to different geographic portions of a particular agricultural region and the at least one synthetic satellite training image corresponds to the particular agricultural region;

processing the at least one synthetic satellite training image using a remote sensing machine learning model to generate inferred terrain conditions for the particular agricultural region; and training the remote sensing machine learning model based on a comparison of the inferred terrain conditions and the corresponding observed terrain conditions and the synthetic terrain conditions.

* * * * *